United States Patent [19]
Perlman

[11] Patent Number: 5,983,223
[45] Date of Patent: Nov. 9, 1999

[54] METHOD AND APPARATUS FOR DETERMINING A LONGEST MATCHING PREFIX FROM A DICTIONARY OF PREFIXES

[75] Inventor: Radia J. Perlman, Acton, Mass.

[73] Assignee: Novell, Inc., Orem, Utah

[21] Appl. No.: 08/852,230

[22] Filed: May 6, 1997

[51] Int. Cl.⁶ ........................................... G06F 7/02
[52] U.S. Cl. ................................. 707/6; 712/898
[58] Field of Search .................. 709/238, 243; 712/898; 707/3, 6, 10, 100, 101; 370/396, 397, 407, 428

[56] References Cited

U.S. PATENT DOCUMENTS

| | | | |
|---|---|---|---|
| 5,293,379 | 3/1994 | Carr | 370/474 |
| 5,546,390 | 8/1996 | Stone | 370/408 |
| 5,561,421 | 10/1996 | Smith et al. | 341/51 |
| 5,787,430 | 7/1998 | Doeringer et al. | 707/100 |

OTHER PUBLICATIONS

Radia Perlman, Interconnections Bridges and Routers, Copyright 1992 by Addison–Wesley Publishing Company, Inc., pp. 233–239.

*Primary Examiner*—Viet D. Vu
*Attorney, Agent, or Firm*—Cesari and McKenna, LLP

[57] ABSTRACT

An arrangement efficiently renders forwarding decisions for a packet using a forwarding database dictionary of an intermediate node configured to optimize space consumed by addresses stored therein as well as to reduce time required to search those addresses. The arrangement generally includes a lookup mechanism comprising a search engine coupled to a set of registers and to the dictionary. The register set, in turn, comprises a number of registers operating in parallel to compare values specified by a number of bits with a predetermined starting point of an input string. The specified values are preferably representative of address prefixes stored in the dictionary and the input string is a destination address of the packet.

17 Claims, 5 Drawing Sheets

METHOD AND APPARATUS FOR DETERMINING A LONGEST MATCHING PREFIX FROM A DICTIONARY OF PREFIXES

FIELD OF THE INVENTION

This invention relates generally to computer networks and, more particularly, to packet forwarding processes of a computer network.

BACKGROUND OF THE INVENTION

Communication in a computer network involves the exchange of data between two or more entities interconnected by communication links and subnetworks. These entities are typically software programs executing on hardware computer platforms, such as end nodes and intermediate nodes. An example of an intermediate node is a switch or router which interconnects the links and subnetworks to enable transmission of data between the end nodes. The nodes typically communicate by exchanging discrete packets of data according to predefined protocols. In this context, a protocol consists of a set of rules defining how the nodes interact with each other.

Most networks are typically organized as a protocol stack of hardware and software "layers" within each node of the network. The protocol stack layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

One such selected service is a connectionless network service that is generally implemented by a network layer protocol. Network layer protocols are concerned with the routing of packets from the source node to the destination node and, in particular, comprise those algorithms and protocols used by routers when cooperating to calculate paths through a network topology. A routing algorithm is that portion of the network layer software responsible for determining an output communication link over which an incoming packet should be transmitted. To that end, each router maintains a forwarding database table with entries indicating where to forward the packets in accordance with routing algorithm results. The forwarding database entries are typically accessed by referencing addresses of the destination nodes.

Examples of conventional network layer protocols are the ISO Connectionless Network Layer Protocol (CLNP), the Internet (IP) network layer protocol and the Internetwork Packet Exchange (IPX), whereas an example of a conventional routing algorithm is the Dijkstra algorithm. A by-product of execution of the Dijkstra algorithm is a determination of the next hop, e.g., intermediate router, associated with a particular calculated path.

Each protocol stack layer of a transmitting node adds information in the form of a header field to the data packet generated by a sending process of the node as the packet descends the protocol stack. The header fields defined by the network layer services are generally the same primarily because the same information are typically contained in each packet. For example, these headers typically contain fixed-length, hierarchical network layer addresses configured to accommodate relatively large numbers of nodes and subnetworks.

A destination address is used by the routers to determine the route of the packet. When a packet is received at the router, the network layer extracts the destination address from the packet, finds a forwarding database table entry that matches the destination address, determines the next hop that the packet should take based upon the destination address, appends a new network layer header onto the packet (as necessary) and passes the modified packet to a lower protocol stack layer that is responsible for the output communication link associated with the next hop.

Since network layer addresses are hierarchical in nature, network layer protocols that perform routing functions at the same routing level of a network make next hop determinations based upon a similar portion of the destination address referred to as the destination address prefix. Routers store the destination address prefixes in dictionaries of their forwarding databases as tree data structures that are manipulated by a conventional Trie algorithm. To determine the next hop, network layer protocols implement a longest-matching-address-prefix ("longest match") algorithm that searches the dictionary for an entry corresponding to the destination address located in the network layer header.

The tree structure typically comprises a large number of branches each representing a string of the hierarchical destination address fields. The branches of the database have different address field values and/or terminate with a different number of address fields. The longest match algorithm must traverse numerous branches during this address matching process to determine the next hop. Because of the hierarchical characteristics of destination addresses, there may be several destination address prefixes in the dictionary that match at least a portion of a particular destination address. Accordingly, the longest address in the forwarding database dictionary must be found.

The time required to search the dictionary is proportional to the average length of the destination address in the database. In a typical implementation of the Trie algorithm, a fixed portion of the destination address is parsed at discrete steps, e.g., one bit or 4 bits at a time. A problem is that addresses often have a substantial number of bits, particularly in large, hierarchically-arranged networks. Parsing such a long address in small increments results in too many "lookups" into the database table, a process that is often too slow to keep up with table access bandwidth. On the other hand, parsing the address in longer increments, e.g., 16 bits, can result in a substantial number of choices that consume a substantial amount of table space.

It is thus apparent that, due to the lengths of the destination addresses and the manner in which the longest match algorithm navigates the forwarding database dictionary, address matching functions contribute significantly to the overhead associated with the packet forwarding process performed by network layer protocols; this, in turn, adversely affects the router's efficiency. The present invention is directed towards an efficient and accurate means for finding the longest match in a forwarding database dictionary that matches an address in a packet to be forwarded by an intermediate node.

SUMMARY OF THE INVENTION

The invention relates to an arrangement for efficiently rendering forwarding decisions for a packet using a forwarding database dictionary of an intermediate node configured to optimize space consumed by addresses stored therein as well as to reduce time required to search those addresses. The arrangement generally includes a lookup mechanism comprising a search engine coupled to a set of registers and to the dictionary. The register set, in turn, comprises a number of registers operating in parallel to compare values specified by a number of bits with a predetermined starting point of an input string. The specified values are preferably representative of address prefixes stored in the dictionary and the input string is a destination address of the packet.

According to the arrangement, a multi-stage technique is provided for creating the search engine optimized to search address prefixes of the dictionary. In a first stage of the technique, a fixed number of the registers within the register set are initially allocated as hash buckets with predetermined designations such as 0, 1 or *, wherein * is a default designation. Starting with the first bit of each address prefix in the dictionary, each prefix is assigned to a hash bucket having a matching designation. If there are any hash buckets with no assigned prefixes, those buckets are "recycled".

The designation of each hash bucket is expanded to more than 1 bit if there is a common substring of values among the prefixes assigned to each bucket, e.g., the hash bucket designated 1 would become 1101 if all prefixes assigned to that bucket have the same common substring 1101. A determintion is then made as to whether there are any remaining registers. If so, it is determined whether any register has more than one assigned prefix entry. If not, the pointer of the register is configured to a termination value that effectively ends the creation sequence. However, if there is at least one register with more than one assigned prefix entry, the hash bucket with the most assigned prefix entries is selected and those prefixes are apportioned among the remaining registers on the basis of a common substring terminated by one of the predetermined designations 1, 0 or *, e.g., if 1101 had the most assigned prefixes, the hash bucket 1101 would be apportioned between hash buckets 11010, 11011 or 1101*. The sequence then returns to recycle those hash buckets with no assigned prefixes and continues until all of the registers are used.

Note that if there is only one remaining register, the hash bucket (labelled string p) cannot be subdivided if there are substrings matching p*, p0 and p1. In this case, the second most populated hash bucket is chosen for subdivision. If no hash bucket can be subdivided, the longest prefix from the hash bucket with the most prefixes is selected and the remaining register is labelled with that prefix.

It should be further noted that a data structure is associated with each register of the register set so that the following information may be loaded into each register when running the search engine: (i) each common substring of prefix values, e.g., 11011; (ii) the number of bits to match, e.g., 5; (iii) a pointer to another data structure with values for loading all registers of the set during a next stage of the technique if the register yields the longest match; and (iv) the longest prefix (so far) if the next stage of the technique yields no match.

Continuing with the first stage of the technique, it is determined whether any register has more than one assigned prefix entry. If not, the pointer of the register is configured to a termination value that effectively ends the creation sequence. However, if there is at least one register with more than one assigned prefix entry, a second stage of the technique is entered. Note that prior to entering this next stage, the values to be loaded in the registers during execution of the search engine are written to a predetermined data structure so that all of the registers of the set are available for reuse. The second stage then commences with a sequence similar to the previous stage; i.e., a fixed number of the registers within the register set are initially allocated as hash buckets with predetermined designations such as 0, 1 or *, wherein * is a default designation. Starting with bit position n+1, where n is the number of bits of the common substring matched so far, each prefix is assigned to a hash bucket having a matching designation. If there are any hash buckets with no assigned prefixes, those buckets are recycled.

The designation of the hash bucket is expanded to more than the initial designated bit if there is a common substring of values among the prefixes assigned to each bucket. If there are any remaining registers, the hash bucket with the most assigned prefix entries is selected and those prefixes are divided among the remaining registers on the basis of a common substring terminated by one of the initial designated bits (0, 1, *). Again, the sequence returns to recycle those hash buckets with no assigned prefixes and continues until all of the registers are used. Moreover, additional stages of the technique are entered (having a sequence similar to sequences described above) until each register has only one prefix entry.

The arrangement then provides a technique for executing the optimized search engine to search the prefixes of the dictionary. Operationally, the search engine initially loads the registers with values stored in the predetermined data structure, and compares the contents of the registers with the input string beginning with a first bit of the input address. The outputs of the registers are the number of bits matched in the registers. Those outputs that matched are compared and the register having the largest number of matching bits "wins", i.e., is selected. If the winning register's value ends in *, the program ends and that value is the longest match.

Otherwise, the pointer associated with the winning register references an associated data structure having a new set of values that are loaded into the complete set of registers. The search engine continues execution by comparing the contents of the registers with the input address beginning with bit position k+1 of the input address, where k is the number of bits previously matched. If there is not a match between the specified value loaded in the register and the corresponding value of bits in the input address, the value of the winning register of the previous stage is the longest match. On the other hand if there is a match, the output of the register is the number of bits matched in the register. The outputs of all registers that matched are compared and the register having the largest number of matching bits is selected. If the winning register's value ends in *, the program ends and that value is the longest match.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
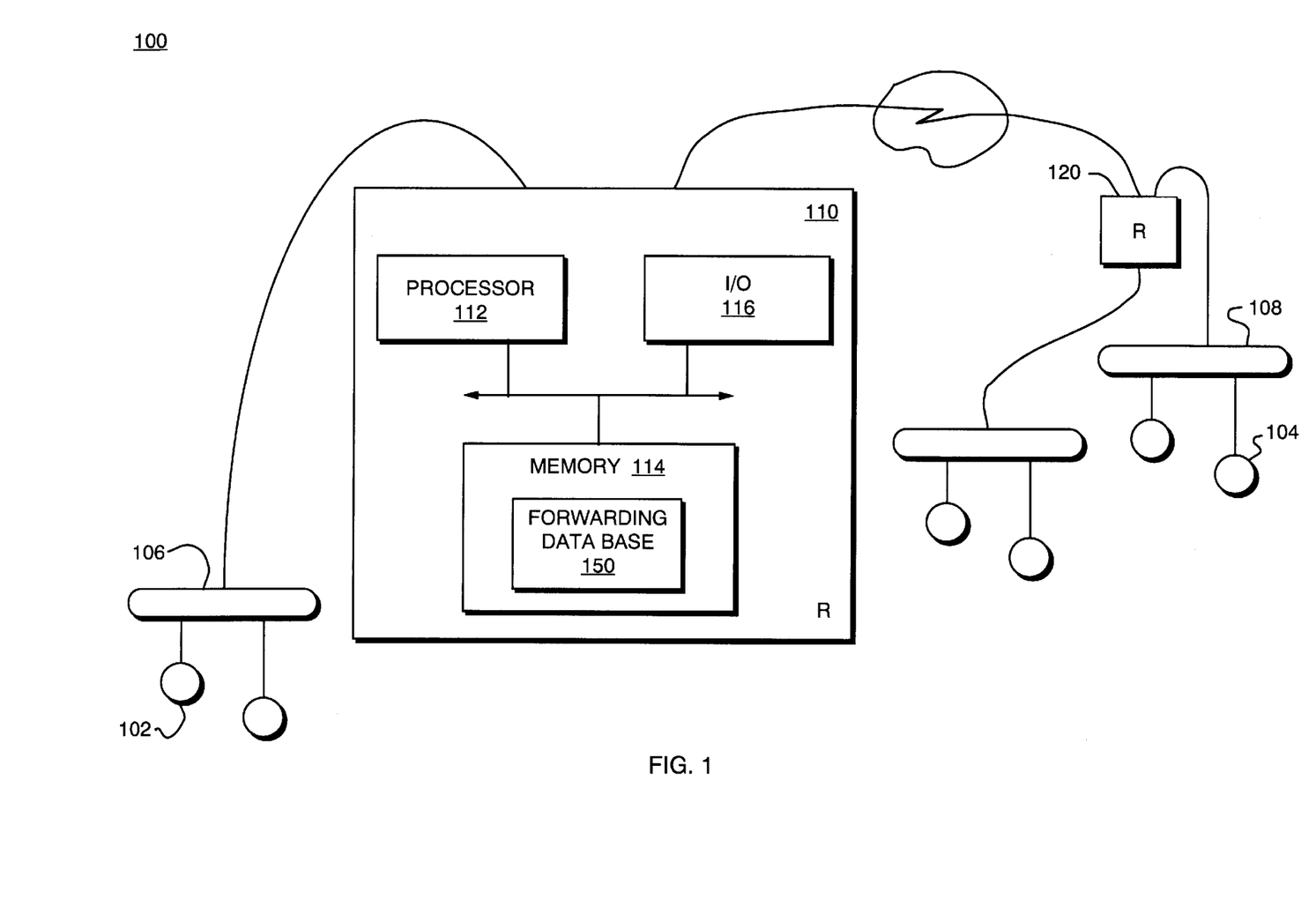
FIG. 1 is a block diagram of a computer network including a collection of communication links and subnetworks connected to a plurality of nodes.

FIG. 1 is a block diagram of a computer network 100 comprising a collection of communication links and subnetworks connected to a plurality of nodes. The nodes are typically computers comprising source node 102, destination node 104 and intermediate nodes 110, 120 which are preferably routers (R). The subnetworks are preferably local area networks (LANs) interconnected by the routers, although the subnetworks may comprise other communication links, such as wide area networks. Communication among the nodes coupled to the LANs is typically effected by exchanging discrete data packets among the nodes. The routers facilitate the flow of these packets throughout the network by routing them to proper receiving nodes.

Each router typically comprises a plurality of interconnected elements, such as a processor 112, a memory 114 and an input/output (I/O) adapter 116. The memory 114 may comprise storage locations addressable by the processor and adapter for storing software programs and data structures associated with the inventive technique described herein. The memory may be further organized as a forwarding database table 150 for storing computed routing information and parameters although, in an alternate embodiment, a disk (not shown) may be coupled to the I/O adapter and configured to function as the database.

The processor may further comprise processing elements or forwarding logic for executing the software programs and manipulating the data structures and packets according to the techniques described herein. An operating system, portions of which are typically resident in memory and executed by the processor, functionally organizes the router by, inter alia, invoicing network operations in support of software processes executing on the router. It will be apparent to those skilled in the art that other processor and memory means, including various computer readable media, may be used for storing and executing program instructions pertaining to the described techniques.

In general, when source node 102 transmits a packet over a LAN, such as LAN 106, the packet is sent to all nodes on that LAN. If the intended recipient of the packet is connected to LAN 108, the packet is routed through routers 110, 120 onto LAN 108. Typically, the packet contains two destination addresses: the address of the final destination node 104 and the address of the next node along the route. The final destination address remains constant as the packet traverses the networks, while the next destination address changes as the packet moves from node to node along the route through the network.

A key function of a router is determining the node or next hop to which the packet is sent; this routing function is preferably performed by a network layer of a conventional protocol stack within each node. This aspect of the network layer concerns the algorithms and protocols used by routers when cooperating to calculate paths through a network topology. The routers execute these routing algorithms to decide over which communication links incoming packets should be transmitted. Each router maintains a forwarding database table 150 with entries indicating where to forward the packets in accordance with routing algorithm results. The forwarding database table entries are typically accessed by referencing destination addresses stored in network layer headers of the packets.

Specifically, each router stores destination address prefixes in a dictionary of its forwarding database as a tree data structure that is manipulated by a conventional Trie algorithm. The destination address prefix is that portion of the destination address used to make next hop determinations. The network layer protocol preferably implements a longest-matching-address-prefix ("longest match") algorithm that searches the forwarding database dictionary for an entry corresponding to an input destination address prefix.

In a typical implementation of the Trie algorithm, a fixed portion of the destination address is parsed at discrete steps, e.g., one bit or 4 bits at a time. However, parsing a relatively long address in small increments results in too many "lookups" into the database dictionary table, a process that is often too slow to keep up with table access bandwidth. On the other hand, parsing the address in longer increments, e.g., 16 bits, can result in a substantial number of choices that consume a substantial amount of table space.

In accordance with the present invention, an arrangement is provided for efficiently rendering forwarding decisions for a packet using a forwarding database dictionary of an intermediate node (router) configured to optimize space consumed by addresses stored therein as well as to reduce time required to search those addresses. The arrangement generally includes a lookup mechanism, a block diagram of which is provided in FIG. 2. The lookup mechanism 200 comprises a search engine 210 interconnecting a set of registers 250, the dictionary 270 and a buffer 230 for storing an input address. The search engine 210 comprises circuitry such as comparators and supporting logic needed to perform comparison and other logical operations described herein.

Figure 2:
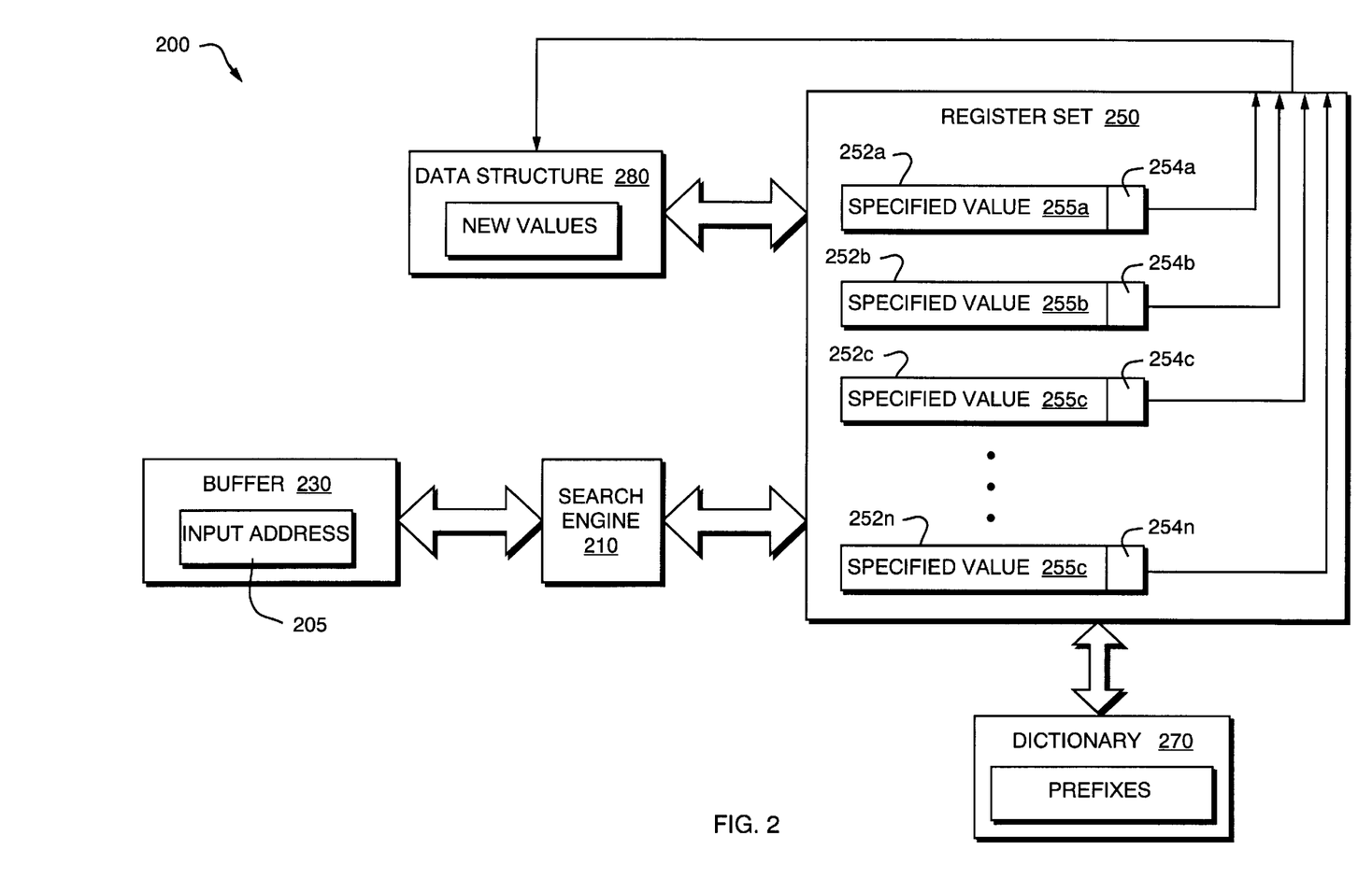
FIG. 2 is a block diagram of a lookup mechanism according to the present invention comprising a search engine coupled to a dictionary of a forwarding database table and a plurality of registers.

In the illustrative embodiment, the register set 250 comprises a number of registers 252a–n operating in parallel to compare values specified by a number of bits stored therein with a predetermined starting point of the input address stored in buffer 230. The specified values 255a–n stored in the registers 252a–n are representative of address prefixes stored in the dictionary 270 and the input address 205 is preferably a destination address of the packet.

Figure 3A:
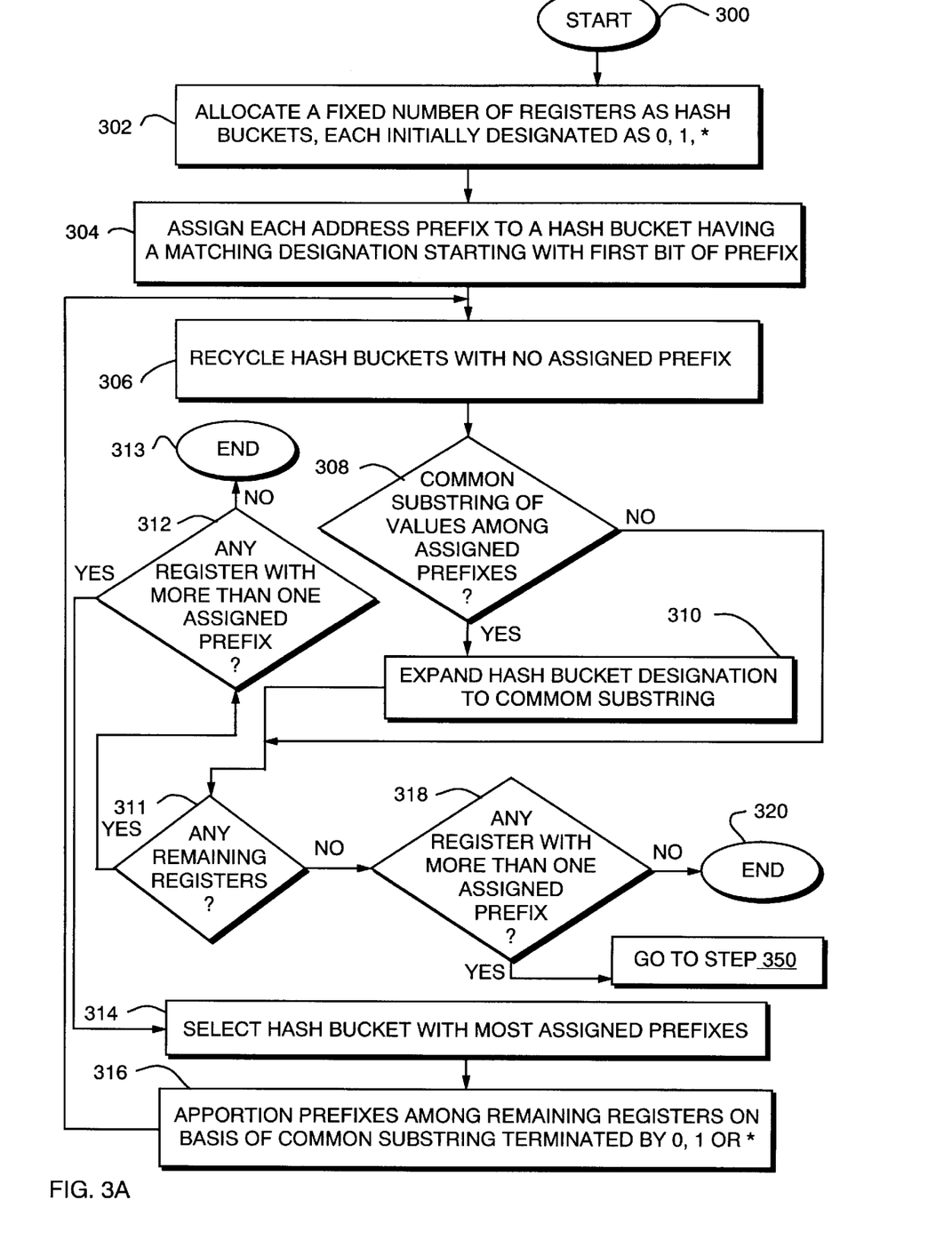
FIGS. 3A and 3B are flowcharts illustrating the creation of the search engine optimized for searching address prefixes of the dictionary in accordance with the invention.
Figure 3B:
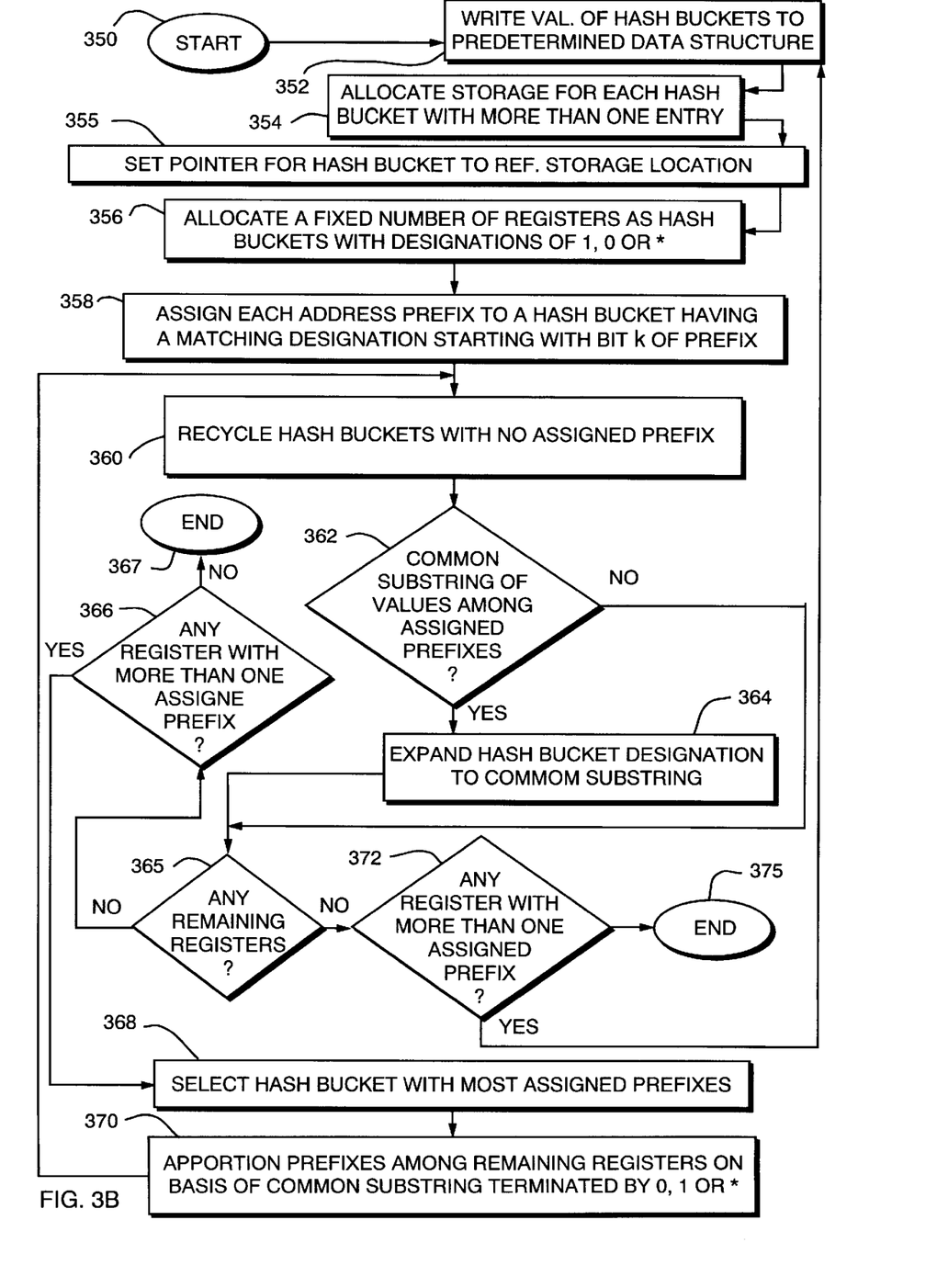

FIGS. 3A and 3B are flowcharts illustrating a multi-stage technique for creating the search engine optimized to search address prefixes of the dictionary. The first stage of the technique starts at Step 300 and proceeds to Step 302 where a fixed number of the registers within the register set are initially allocated as hash buckets with predetermined designations. For example, three (3) registers of the register set comprising, e.g., ten (10) registers, may be allocated as hash buckets with each bucket initially designated as either 0, 1 or *, wherein * is a default designation. Starting with the first bit of each address prefix in the dictionary (Step 304), each prefix is assigned to a hash bucket having a matching designation. For example, a prefix matching the designation * is a zero-length prefix. If there are any hash buckets with no assigned prefixes, those buckets are "recycled" in Step 306.

In Step 308, it is determined whether there is a common substring of values among the assigned prefixes; if so, the bucket designation is expanded to that common substring in Step 310. For example, the hash bucket designated 1 would become 1101 if all prefixes assigned to that bucket have the same common substring 1101. A determination is made in Step 311 as to whether there are any remaining registers. If there are registers remaining, another determination is made in Step 312 as to whether any register has more than one assigned prefix entry. If not, the pointer of the register is configured to a termination value that effectively ends the creation sequence with a resulting, optimized search engine (Step 313). However, if there is at least one register with more than one assigned prefix entry, the hash bucket with the most assigned prefix entries is selected (Step 314) and those prefixes are apportioned among the remaining registers on the basis of a common substring terminated by one of the inital values (Step 316). That is, if the hash bucket with the common substring of 1101 has the most entries, those entries are assigned to one of three remaining registers ("new" hash buckets) with each new bucket now designated as either 11010, 11011 or 1101*. The sequence then returns to Step 306 and the sequence continues until all of the registers are used.

It should be noted that if there is only one remaining register, the hash bucket (e.g., labelled string p) cannot be subdivided if there are substrings matching p*, p0 and p1. In this case, the second most populated hash bucket is chosen for subdivision. If no hash bucket can be subdivided, the longest prefix from the hash bucket with the most prefixes is selected and the remaining register is labelled with that prefix.

It should be further noted that a data structure is associated with each register of the register set so that the following information may be loaded into each register when running the search engine: (i) each common substring of prefix values, e.g., 11011; (ii) the number of bits to match, e.g., 5; (iii) a pointer 254 to another data structure with values for loading all registers of the set during a next stage of the technique if the register yields the longest match; and (iv) the longest prefix (so far) if the next stage of the technique yields no match.

Continuing with the first stage of the technique, if there are no remaining registers (Step 311) a query is made in Step 318 whether any register has more than one assigned prefix entry. If not, the pointer of the register is configured to a termination value that effectively ends the creation sequence with a resulting, optimized search engine (Step 320). However, if there is at least one register with more than one assigned prefix entry, a second stage of the technique is entered.

FIG. 3B depicts a subsequent stage of search engine creation which starts at Step 350 and proceeds to Step 352 where the values to be loaded in the hash buckets during execution of the search engine are written to a predetermined data structure so that all of the registers of the set are available for reuse. Storage is allocated for each hash bucket with more than one entry (Step 354) and the pointer for that hash bucket is set to reference that storage location in Step 355 so that the subsequent stage can be entered if the multiple-entry hash bucket "wins" during execution of the search engine. Thereafter, a sequence similar to the previous stage commences; i.e., a fixed number of the registers within the register set are initially allocated as hash buckets with predetermined designations such as 0, 1 or ***, wherein * is a default designation (Step 356). Staring with bit position n+1, where n is the number of bits of the common substring matched so far, each prefix is assigned to a hash bucket having a matching designation in Step 358. Those hash buckets having no assigned prefixes are recycled in Step 360**.

In Step 362, it is determined whether there is a common substring of values among the assigned prefixes; if so, the bucket designation is expanded to that common substring in Step 364. A determination is made in Step 365 as to whether there are any remaining registers. If there are registers remaining, a determination is made in Step 366 as to whether each register has only one prefix entry. If not, the pointer of the register is configured to a termination value that effectively ends the creation sequence (Step 367). However, if there is at least one register with more than one assigned prefix entry, the hash bucket with the most assigned prefix entries is selected (Step 368) and those prefixes are apportioned among the remaining registers on the basis of a common substring terminated by one of the inital values (Step 370). The sequence returns to Step 360 and the process repeats until it is determined that there are no remaining registers (Step 366).

If there are no remaining registers (Step 365), a query is made in Step 372 as to whether each register has only one prefix entry. If not, the pointer of the register is configured to a termination value that effectively ends the creation sequence (Step 375). However, if there is at least one register with more than one assigned prefix entry, the sequence returns to Step 352 where another subsequent stage of the technique is entered and the process described above is repeated until each register has only one prefix entry.

Figure 4:
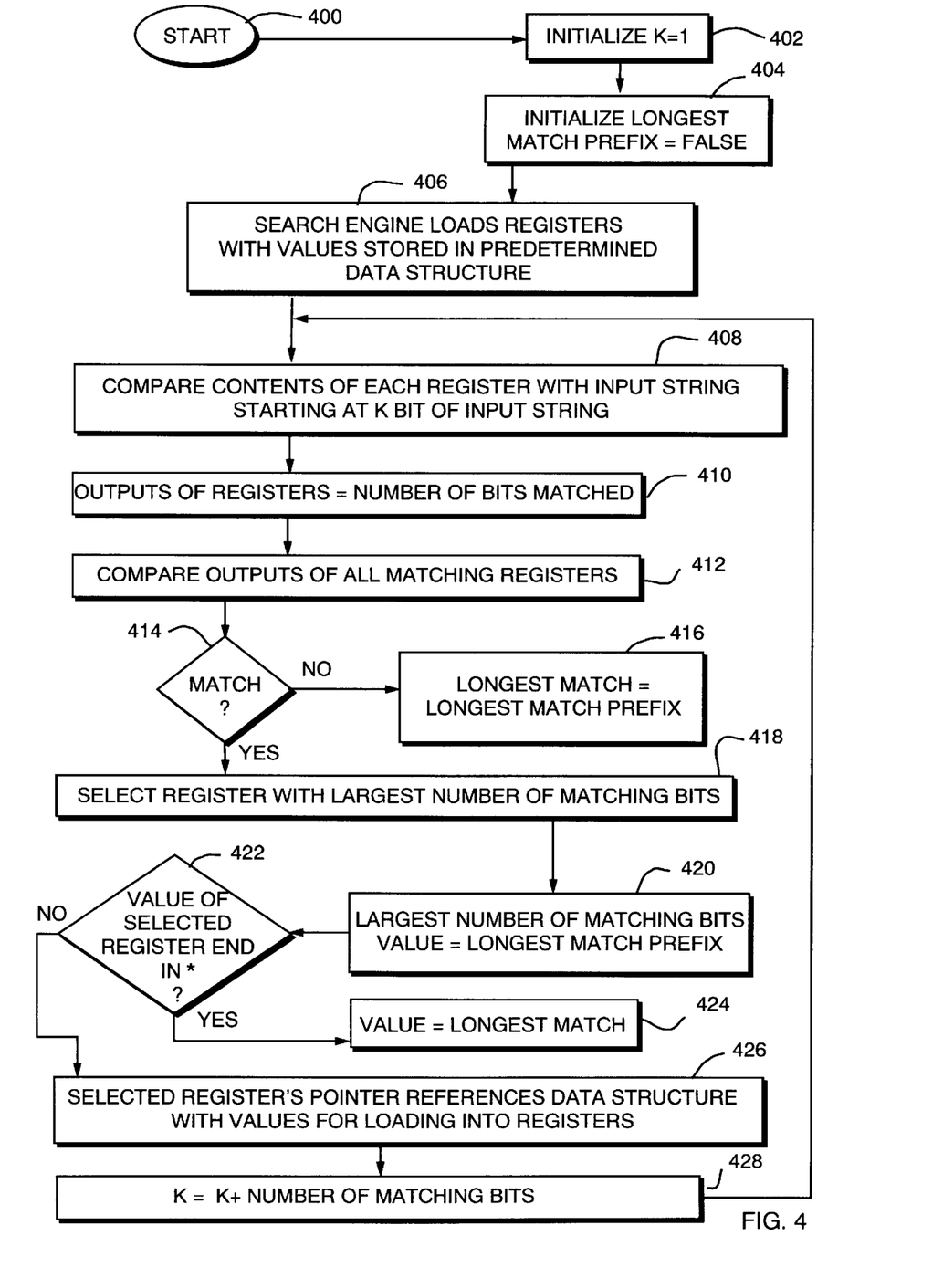
FIG. 4 is a flowchart depicting operation of the search engine in accordance with the lookup mechanism of the present invention.

FIG. 4 is a flowchart depicting a technique for executing the optimized search engine to search the address prefixes of the dictionary. Operation starts at Step 400 and proceeds to Step 402 where a variable k is initialized to a value of 1. In Step 404, a variable designated the "longest match prefix" is also initialized to a false value. In Step 406, the search engine 210 loads the registers 252 with values 255 stored in the predetermined data structure and, in Step 408, compares the contents of the registers with the input string (i.e., destination address 205) beginning with a first bit (k=1) of the input address. The outputs of the registers are the number of bits matched in the registers (Step 410). The outputs of all registers that match are compared in Step 412 and in Step 414, it is determined whether there is a match between the specified values loaded in the registers and the corresponding value of bits in the input address. If there is no match, the longest match prefix variable is set to equal the longest match (Step 416).

If there is a match, the register having the largest number of matching bits "wins", i.e., is selected, in Step 418. In Step 420, the value of the largest number of matching bits of the selected register is set to the longest match prefix variable. If the winning register's value ends in * (Step 422), the technique ends and that value is the longest match (Step 424). Otherwise, the pointer associated with the winning register references an associated data structure having a new set of values that are loaded into the complete set of registers (Step 426). The variable k is then defined to equal k+the number of matching bits (Step 428) and the process returns to Step 408 and repeats until a longest match is determined.

It is noted that the lookup technique described herein is an enhancement to the conventional Trie algorithm. As described, the inventive technique advantageously configures the forwarding database in a manner that optimizes table space as well as reduces time required to search for the matching address.

While there has been shown and described an illustrative embodiment for implementing a novel technique for efficiently rendering forwarding decisions for a packet using a forwarding database dictionary of a router, it is to be understood that various other adaptations and modifications may be made within the spirit and scope of the invention. In an alternate embodiment of the creation sequence for the inventive search engine, the specified value loaded into each register may be dependent upon the number of address prefix bits in the dictionary that can be compared with the input address within a constraint defined by the number of registers in the register set. That is, in order to compare i address prefix bits with the input address in a "worst case" scenario, $2^{i+1}-1$ registers are needed.

For example, if there are twenty (20) registers in the set, then at least the first three (3) bits of the input address can be compared. Comparison of 3 bits would render the following fifteen (15) values: *, 0*, 1*, 00*, 01*, 10*, 11*, 000, 001, 010, 011, 100, 101, 110, 111. The registers are labelled with the specified values and, starting with the first bit of each address prefix in the dictionary, each prefix is assigned to a register having a matching value. Thereafter, the creation sequence proceeds as in the illustrative embodiment; that is, the register with the most assigned prefix entries is selected and those prefix entries are apportioned among the remaining registers. For instance, if there are 5 unused registers, and the register with the most assigned prefix entries is 001, the entries are assigned to one of three remaining registers with each of those registers having a specified value of either 0010, 0011 or 001*. The sequence continues as described herein until it is determined that there are no remaining registers.

However, if not all of the 15 possible values specified by these 3 bits are matched in the dictionary, then possibly more bits can be compared in a more optimistic scenario. If it is determined that four (4) bits can be compared without exhausting the register set (but that five (5) bits are too many), for some comparison operations substantially more than 4 bits may be compared if those 4 bits do not lead to any other choices. In summary, i can be chosen in a worst case situation that guarantees operation with $2^{i+1}-1$ registers, or i can be chosen "optimistically" with j more bits than the worst case, where j is a parameter.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Method for determining a longest matching prefix from a dictionary of prefixes compared with an input string, the method comprising the steps of:

providing a set of registers for executing a search engine configured to search the prefixes of the dictionary, each register of the set containing a value specified by a number of bits;

comparing, in parallel, the values of the registers with a corresponding number of bits of the input string beginning with a first bit of the input string;

specifying a number of matching bits as an output of each register whose value equals the corresponding number of bits of the input string; and selecting the register having a largest number of matching bits as the longest match.

2. The method of claim 1 wherein the step of specifying comprises one of the steps of:

providing a false indication as the output of each register if there is not a match between the value and the input string; and indicating the number of bits matched in the register as the output of each register if there is match between the value and the input string.

3. The method of claim 2 wherein the step of selecting comprises the step of comparing the outputs of all registers of the set.

4. A computer readable medium containing executable program instructions for creating a search engine configured to determine a longest matching prefix from a dictionary of prefixes compared with an input string, the executable program instructions comprising program instructions for:

allocating a fixed number of registers within a register set as hash buckets with predetermined designations;

assigning each prefix to one of the hash buckets having a matching designation;

expanding the predetermined designation of each hash bucket if there is a common substring of values among the prefixes assigned to each hash bucket;

determining if there are any remaining registers of the register set;

determining if there are any registers with more than one assigned prefix; and if not, providing an optimized search engine.

5. The medium of claim 4 further comprising program instructions for, if there are remaining registers:

selecting the register with the most assigned prefixes; and apportioning those prefixes among the remaining registers on the basis of the common substring terminated by the predetermined designations.

6. The medium of claim 5 further comprising program instructions for:

recycling any hash buckets having no assigned prefixes.

7. The medium of claim 6 further comprising program instructions for, if there are registers with more than one assigned prefix:

writing values to be loaded in the registers during execution of the search engine to a predetermined data structure;

allocating storage locations for each hash bucket with more than one entry; and setting a pointer for each hash bucket to reference the storage locations.

8. The medium of claim 7 further comprising program instructions for:

returning to the step of allocating; and continuing with the program instruction steps until each register has only one assigned prefix, thereby providing the optimized search engine.

9. A computer readable medium containing executable program instructions for executing a search engine configured to determine a longest matching prefix from a dictionary of prefixes compared with an input string, the executable program instructions comprising program instructions for:

initializing k=1, wherein k is a variable that specifies a starting bit position of the input string;

initializing a longest match prefix variable to a false value;

loading each register of a register set with a common substring of prefix values, a number of matching bits and a pointer referencing a data structure containing values for loading the registers;

comparing contents of each register with the input string beginning with a k bit of the input string;

providing the number of matching bits as an output of each register;

comparing the outputs of all matching registers;

determining whether there is a match between the contents of any register and the input string; and if not, specifying a longest match equal to the contents of the longest match prefix variable.

10. The medium of claim 9 further comprising program instructions for, if there is a match between the contents of the register and the input string:

selecting the register with the largest number of matching bits.

11. The medium of claim 10 further comprising program instructions for:

specifying the value of the largest number of matching bits equal to the contents of the longest match prefix variable;

determining whether the selected register has a value ending in *; and if so, designating that value as the longest match.

12. The medium of claim 11 further comprising program instructions for, if the selected register does not have a value ending in *:

accessing the data structure referenced by the pointer of the selected register;

loading the registers of the register set with the values contained in the data structure; and updating k=k+the largest number of matching bits.

13. The medium of claim 12 further comprising program instructions for:

comparing the contents of each register with the input string beginning with a k bit of the input string.

14. The medium of claim 13 further comprising program instructions for:

providing the number of matching bits as an output of each register;

comparing the outputs of all matching registers;

determining whether there is a match between the contents of any register and the input string; and if not, designating the contents of the longest match prefix variable as the longest match.

15. Apparatus for determining a longest matching prefix from a dictionary of prefixes compared with an input string, the apparatus comprising:

a set of registers for searching the prefixes of the dictionary, each register of the set containing a value specified by a number of bits;

a search engine for comparing, in parallel, the values of the registers with a corresponding number of bits of the input string beginning with a first bit of the input string;

means for specifying a number of matching bits as an output of each register whose value equals the corresponding number of bits of the input string; and means for selecting the register having a largest number of matching bits as the longest match.

16. The apparatus of claim 15 wherein the means for specifying comprises:

means for providing a false indication as the output of each register if there is not a match between the value and the input string; and means for indicating the number of bits matched in the register as the output of each register if there is match between the value and the input string.

17. The apparatus of claim 16 wherein the means for selecting comprises means for comparing the outputs of all registers of the set.

* * * * *